A. SEITZ.
HORSE COLLAR.

No. 176,077.

Patented April 11, 1876.

Witnesses.
Otto Hufeland
Chas. Wahlers.

Inventor.
August Seitz
per
Van Santvoord & Hauff
Attorneys

UNITED STATES PATENT OFFICE.

AUGUST SEITZ, OF NEW YORK, N. Y., ASSIGNOR TO HIMSELF AND HENRY SACKMANN, OF SAME PLACE.

IMPROVEMENT IN HORSE-COLLARS.

Specification forming part of Letters Patent No. 176,077, dated April 11, 1876; application filed February 4, 1876.

*To all whom it may concern:*

Be it known that I, AUGUST SEITZ, of the city, county, and State of New York, have invented a new and Improved Horse-Collar, which improvement is fully set forth in the following specification, reference being had to the accompanying drawing, in which—

Figure 1:
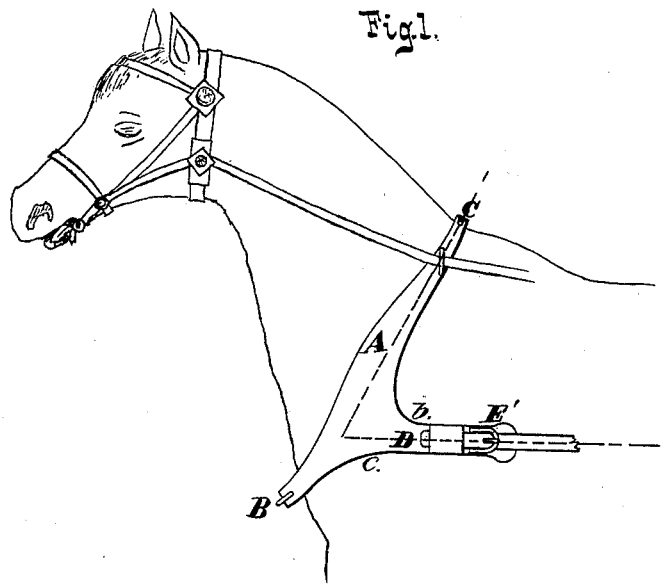
Figure 2:
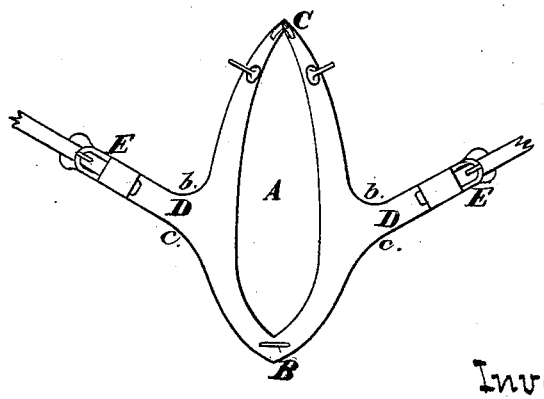

Figure 1 represents a side view of my collar, showing the manner of applying it to a horse. Fig. 2 is a front view of the collar.

Similar letters indicate corresponding parts.

My invention relates to that class of horse-collars having elongated ears on the opposite sides, adapted to be connected with the traces of a harness, the object of the ears being to dispense with a hames. It consists substantially in arranging the elongated ears at an angle less than a right angle to the body of the collar, and in curving the ears in a certain manner hereinafter specified, whereby the weight of the load, which may be drawn by its means, is caused to fall mainly on that part of the collar which is next to or in the immediate vicinity of the elongated ears, and hence, if the ears are placed at the part of the collar which is situated opposite the shoulders of a horse, on which the collar is fitted, the burden of draft is thrown on the horse's shoulders instead of on the breast, as heretofore.

In the drawing, the letter A designates the body of my collar, from the opposite sides of which project elongated ears D D, the said ears extending backward, and being provided with buckles E E', or other equivalent devices, so that the traces of a harness may be connected thereto with facility. These elongated ears D D are situated at an angle less than a right angle to the body A, the direction of the angle being inward or toward the upper end of the collar, as indicated by the line $x\,x$, Fig. 1; and both the upper and lower edges of the elongated ears D D are concave, as shown, the upper edges $b$ being given a short curve, while the lower edges $c$ have a long one.

By thus arranging the elongated ears at an angle less than a right angle to the collar, the ears are made to extend backward in a horizontal direction when the collar is put around a horse's neck, while in the collar heretofore made with elongated ears, and in which the latter are placed at right angles to the plane of the body, the ears occupy an inclined position when the collar is put on a horse. A disadvantage, arising from the arrangement of the elongated ears at right angles to the collar, as last described, consists in that the weight of the load drawn by the collar is thus thrown mainly on the breast portion thereof and on the breast of the horse, so that the object desired to be attained through a horse-collar is practically lost.

This disadvantage is overcome by the peculiar arrangement and shape of the elongated ears D D, the weight of the load being thereby caused to fall on the part of the collar contiguous to the elongated ears, so that if the latter are placed at the shoulder portion of the collar, the greater part of strain falls thereon and on the horse's shoulders, while his breast remains comparatively free.

I prefer to make the body of my collar flat, or without the use of padding, similar to a so-called Dutch collar, so that it is extremely light. A result of this construction being also that the elongated ears D D can be conveniently made in one piece with the covering of the collar.

What I claim as new, and desire to secure by Letters Patent, is—

The combination with a breast-collar, body A, provided with adjusting buckle at the top, the elongated ears D attached at an angle less than a right angle to the body, substantially as described.

In testimony that I claim the foregoing I have hereunto set my hand and seal this 29th day of January, 1876.

AUGUST SEITZ. [L. S.]

Witnesses:
　E. F. KASTENHUBER,
　ROBT. E. MILLER.